(12) United States Patent
Blown et al.

(10) Patent No.: US 6,185,025 B1
(45) Date of Patent: Feb. 6, 2001

(54) METHOD AND APPARATUS FOR TRANSMITTING INFORMATION

(75) Inventors: Keith James Blown, Suffolk; Nicholas John Doran, Birmingham, both of (GB)

(73) Assignee: British Telecommunications public limited company, London (GB)

(*) Notice: Under 35 U.S.C. 154(b), the term of this patent shall be extended for 0 days.

(21) Appl. No.: 08/300,524
(22) PCT Filed: Sep. 3, 1991
(86) PCT No.: PCT/GB91/01486
   § 371 Date: Apr. 20, 1993
   § 102(e) Date: Apr. 20, 1993
(87) PCT Pub. No.: WO92/04786
   PCT Pub. Date: Mar. 19, 1992

Related U.S. Application Data

(63) Continuation of application No. 08/039,371, filed on Apr. 20, 1993, now abandoned.

(30) Foreign Application Priority Data

Sep. 3, 1990 (GB) .................................................. 9019185

(51) Int. Cl.$^7$ .................................................. H04B 10/04
(52) U.S. Cl. ........................... 359/188; 359/173; 359/184
(58) Field of Search .................................. 359/134, 154, 359/160, 173, 181–182, 184, 188, 195; 385/122, 24

(56) References Cited

U.S. PATENT DOCUMENTS

| | | | |
|---|---|---|---|
| 4,406,003 | * 9/1983 | Eberly et al. | 359/157 |
| 4,406,516 | * 9/1983 | Hasegawa | 359/188 |
| 4,558,921 | * 12/1985 | Hasegawa et al. | 359/160 |

(List continued on next page.)

FOREIGN PATENT DOCUMENTS

| | | | |
|---|---|---|---|
| 0339840 | * 11/1989 | (EP) | 359/134 |
| 0588646 A2 | 3/1994 | (EP) . | |
| 0637159 A2 | 2/1995 | (EP) . | |
| 0157830 | * 6/1990 | (JP) | 359/188 |
| WO 9607286 | 3/1996 | (WO) . | |

OTHER PUBLICATIONS

*Optics Communications*, vol. 70, No. 5, Apr. 1, 1989, Amsterdam NL, pp. 389–392; Uzunov et al: "Propagation of One–Soliton Pulses Successions in Monomode Optical Fibers".

Optical Fiber Communication Conference, 1989 Technical Digest Series, vol. 5 Conference Edition, vol. 5, Feb. 8, 1989, Houston, Texas, US, p. 97, Olsson: "Ultralong–range Solition Transmission".

(List continued on next page.)

*Primary Examiner*—Kinfe-Michael Negash
(74) *Attorney, Agent, or Firm*—Nixon & Vanderhye P.C.

(57) ABSTRACT

An optical communications system comprises a laser (10) controlled to output a stream of soliton pulses (12) coupled to a beamsplitter arrangement (14, 20, 22) which converts the pulse stream (12) to a stream of pulses (24) having twice the pulse rate. This stream of pulses (24) is modulated to form a binary coded signal by modulator (24) as a series of binary digits each having one of two values in which a series of n optical soliton pulses, where n is an integer>1 is coupled into an optical fibre (4) at each occurrence of one of the two values. The optical fibre (4) and repeaters (6) provide a transmission link to a receiver (8). The present invention allows one to increase the average power within a bit without having to operate with shorter pulses that would otherwise be necessary with one soliton pulse per bit of prior art systems in order to avoid the limits inherent in single soliton pulse per bit prior art systems. The result is that the ASE noise limit is moved to longer pulses so allowing higher bit rates notwithstanding that there is a greater number of solitons in each bit of data than with single soliton per bit scheme of modulation. The method also reduces GH jitter and thus opens the window of operation by pushing the G-H limit to longer pulses

18 Claims, 4 Drawing Sheets

U.S. PATENT DOCUMENTS

| | | | |
|---|---|---|---|
| 4,633,524 | * 12/1986 | Hasegawa | 359/160 |
| 4,700,339 | * 10/1987 | Gordon et al. | 359/134 |
| 4,741,587 | * 5/1988 | Jewell et al. | 359/160 |
| 4,920,556 | 4/1990 | Wong | 379/51 |
| 5,035,481 | * 7/1991 | Mollenauer | 359/188 |
| 5,392,342 | 2/1995 | Rosenthal | 379/211 |

OTHER PUBLICATIONS

Patent Abstracts of Japan, vol. 10, No. 54, Mar. 4, 1986 & JP A 60 208 129 (Toshiba K.K.) Oct. 19, 1985.

R.C Alferness, "Waveguide Electrooptic Modulators", IEEE Transactions on Microwave Theory and Techniques, vol. MTT–30, No. 8, pp. 1121–1137 (1982).

Hasegawa et al, "Signal Transmission by Optical Solitons in Monomode Fiber", Proceedings of the IEEE, vol. 69, No. 9, Sep. 1981, pp. 1145–1150.

Patent Abstracts of Japan, vol. 17, No. 101 (E–1327), Mar. 2, 1993 & JP–A–04 290346 (Fujitsu Ltd), Oct. 14, 1992.

* cited by examiner

METHOD AND APPARATUS FOR TRANSMITTING INFORMATION

This is a continuation of application Ser. No. 08/039,371, filed Apr. 20, 1993, now abandoned.

BACKGROUND OF THE INVENTION

1. Field of the Invention

The present invention relates to a method of transmitting information where information is represented a series of binary digits (bits) each having one of two values The present invention also relates to a transmitter for generating such information for transmission, a transmission system for conveying such information, and a communications system for communicating such information between parties.

The present invention in its different aspects finds particular, but not exclusive, application to situations in which information is to be conveyed by means of an optical fibre waveguide in which spaced-apart, discrete, optical fibre amplifiers are used to compensate for losses caused during propagation along the optical fibre.

2. Related Art

For a receiver of a particular bandwidth at the end of such a communication system to be able to detect transmitted signals within a given error rate it must receive signals having a signal-to-noise (S/N) greater than some minimum value.

In an optical fibre transmission line with in-line optical fibre amplifiers, noise is generated by amplified spontaneous emission (ASE) in the amplifiers. The total noise generated by the optical transmission line therefore depends on the number of amplifiers in the line and the ASE noise generated by each amplifier.

The ASE noise is a function of the gain of amplifier which is given by $$g = 0.23 L_S \gamma / n \text{ dB} \quad (1)$$

where $L_5$ is the system length in km;

n is the total number of amplifiers, all assumed the same; and $\gamma$ is the system loss in dB/km.

The solution pulses propagating down the optical fibre transmission line will lose energy and be subject to intermittent amplification. In order to have propagation in which the distance average power of the pulse is equal to a single soliton power it can be shown that an Nth order soliton has to be launched into the optical transmission line where N is given by $$N^2 = \log(g)/(1 - 1/g) \quad (2)$$

The minimum average power Pmin necessary to achieve an S/N ratio sufficient to give a $10^{-14}$ bit error rate is $$P_{min} = 10^{-4} Bn[\exp(45 L_S/n) - 1] \text{mw} \quad (3)$$

where B is the bandwidth in G/bits.

It can be shown that the pulse width required to generated the required Nth-order soliton pulse of the desired minimum average power P and bandwidth B is given by $$t_{ASE} = 0.658 \, N^2 BD/P \quad (4)$$

where D is the dispersion.

Equation (4) puts a constraint on the maximum soliton pulse width, t, to achieve the desired S/N ratio.

Another source of noise which becomes increasingly important at higher bit rates is the Gordon-Haus effect: see J. P. Gordon and H. A. Haus, Random Walk of Coherently Amplified Solitons in Optical Fibre Transmission, Optics Lett 11 665–7 (1986).

This effect induces an error due to fluctuations in arrival times, $t_n$, which occurs from the combined action of an ASE induced frequency fluctuation and dispersion. The mean square jitter can be expressed as $$\langle \gamma t_a^2 \rangle = \left( \frac{D^2 L_s}{9 t^2} \right) \left( \frac{n_{noise}}{n_{pulse}} \right) \quad (5)$$

where n's are photon numbers. The error rate due to this effect can be calculated.

The operating nonlinear dynamics imposes a second requirement that the soliton period be rather longer than the amplifier spacing $L_A$, namely $$t_{spacing} > (0.3 DL_1 \alpha)^{1/2} \quad (6)$$

where $\alpha$ is a safety factor of about 10. Once these two conditions of equations (4) and (7) are satisfied one observes essentially distortionless propagation of single pulses over arbitrarily large distances.

In FIG. 1 is shown a plot of amplifier spacing against pulse duration showing the three limiting processes (equations 4,5 and 6) for the example of a 6000 km system length. The G-H effect is the only one which depends on bit rate and this is plotted for three bit rates (10, 8 and 5 Gbit/s).

To operate a prior art soliton transmission system, t, the soliton pulse width, must be less than the G-H limit, less than $t_{ASE}$ and greater than $t_{spacing}$.

SUMMARY OF THE INVENTION

According to a first aspect of the present invention there is provided a method of transmitting information as a series of binary digits, each having one of two values, in which a series of n optical soliton pulses, where n is an integer>1, is coupled into an optical fibre at each occurrence of one of the two values.

According to a second aspect of the present invention there is provided an optical transmitter for transmitting information as a series of binary digits each having one of two values comprising a source of optical soliton pulses arranged to provide a series of n optical soliton pulses, where n is an integer>1, at each occurrence of one of the binary digit values, and optical coupling means for coupling the series of pulses into an optical fibre.

The present invention allows one to increase the average power within a bit without having to operate with shorter pulse that would otherwise be necessary with one soliton pulse per bit of prior art systems in order to avoid the limits imposed by equations 5 and 6 on single soliton pulse per bit prior art systems. The result is that the ASE noise limit is moved to longer pulses so allowing higher bit rates notwithstanding that there are a greater number of solitons in each bit of data than with single soliton per bit schemes of modulation.

The method also reduces G-H jitter and the thus opens the window of operation by pushing the G-H limit to longer pulses. The reason for this is that the pulse will be independently subject to a jitter so that an error will occur only if both pulses are sufficiently shifted. A simple delta function model for the pulses given a $n^{1/2}$ reduction in the jitter.

A potential problem with the multiple pulse per bit modulation scheme of the present invention is pulse-pulse (i.e. soliton-soliton) interaction. This is a well known phenomenon which leads to a collapse of the pulses if they are initially in phase. The total energy per bit is unaltered by the collapse and so this will not, in principle, affect the system performance. It is desirable in such cases that there is no interaction with the adjacent bit pulses. It is then preferable that each series of n optical soliton pulses representative of a binary digit is separated from the next series by a time interval greater than the pulses within each series.

When pulse-pulse interaction is significant it is also desirable that each pulse in each series of n optical soliton pulses is O or $\pi/2$ radians out of phase relative to the adjacent pulses in the series.

A convenient way to achieve variations in pulse spacing and phase control for two solitons per bit is a transmitter comprising means for generating a stream of optical soliton pulses, a beam splitter located to split the stream of optical pulses into two subsidiary streams, a pair of reflective means to reflect the two subsidiary streams back to the beam splitter, the reflective means being positioned such that positions of the two subsidiary streams are combined by the beam splitter to form as an output stream of optical soliton pulses alternate ones of the subsidiary streams. Series of pulses greater than two can be readily produced by multiplexing the appropriate number of such transmitters.

The distance of one of the reflective means, for example a mirror, can be made adjustable to provide equidistantly spaced or paired optical pulses of the desired phase relationship. Once this phase is fixed the collapse effect on propagation will not reduce the energy in the bit interval. The proposed scheme can also operate in the regime of complete overlap of the pulses in the centre of the bit. This is equivalent to operating with solitons of the initial form Nsech(t) with N an integer equivalent to the number of pulses per bit. This latter multiple soliton modulation scheme will have the same benefit as for the increase in average power but will not have the benefit of the reduced jitter.

According to a third and a fourth aspect of the present invention an optical transmission system comprises an optical transmitter optically coupled to an optical fibre communications network having two or more spaced apart optical amplifiers and an optical communications system comprising the above transmission system and an optical receiver coupled to the optical fibre communications network for receiving the transmitted optical spliton pulses.

BRIEF DESCRIPTION OF THE DRAWINGS

An embodiment of the present invention illustrating its several aspects and its principle of operation will now be described with reference to the accompanying drawings of which.

DETAILED DESCRIPTION OF EXEMPLARY EMBODIMENTS OF THE INVENTION

Figure 1:
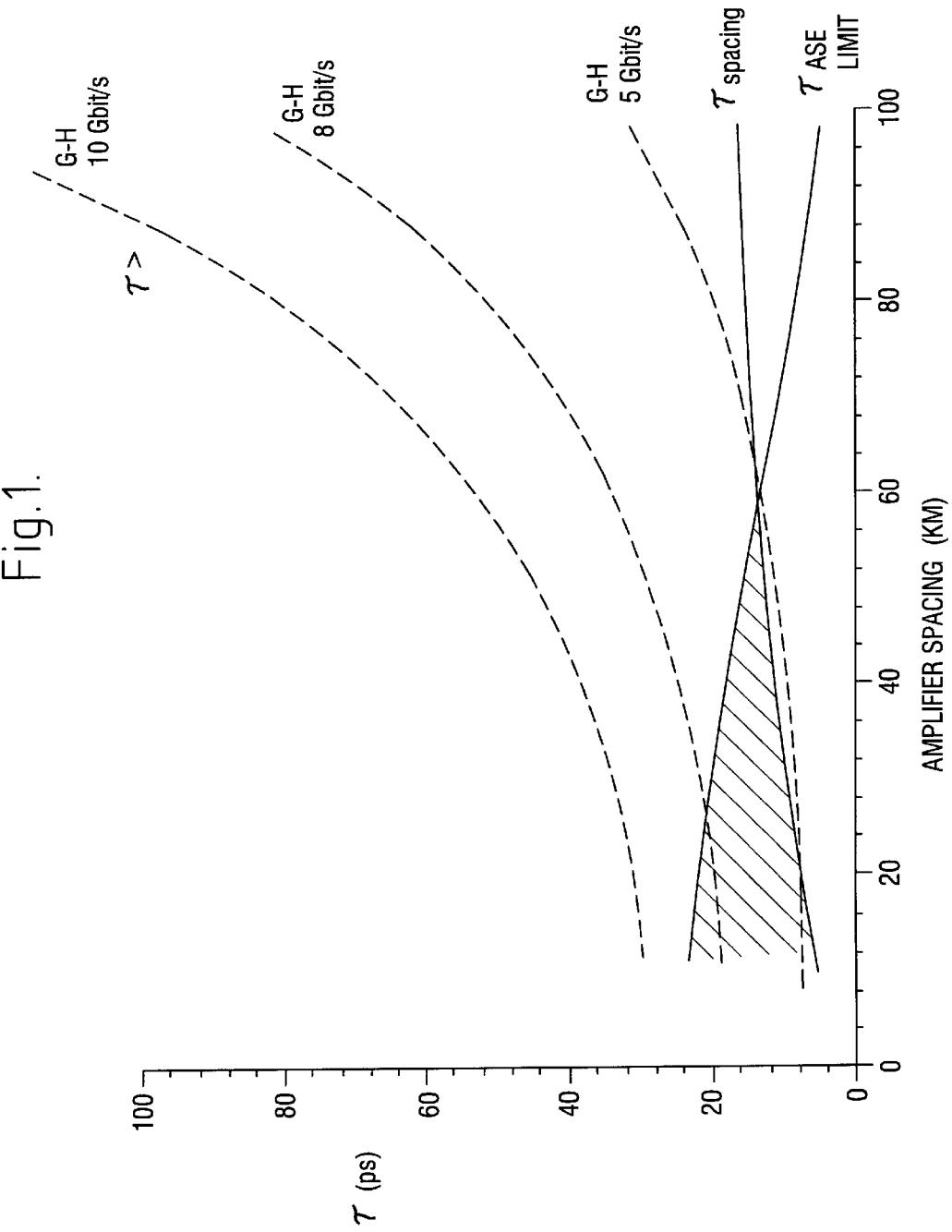
FIG. 1 is a graph of the factors determining the operational limits of a prior art, 6000 km, single soliton pulse per bit, soliton communications system.

FIG. 1 shows the calculated limits of $t_{spacing}$, $t_{ASE}$ and the Gordon-Haus limit for 5.8 and 10 Gbits/s data rates for single soliton/bit transmission. Transmission is possible for amplifier spacings for which there is a pulse width that is simultaneously less than $t_{ASE}$, greater than $t_{spacing}$ and greater than the G-H bit rate limit. This window of operation is shown shaded in FIG. 1. It can be seen that for large inter-amplifier spacing of say 50 km one is limited to data rates of up to about 5 Gbits/s.

Figure 2:
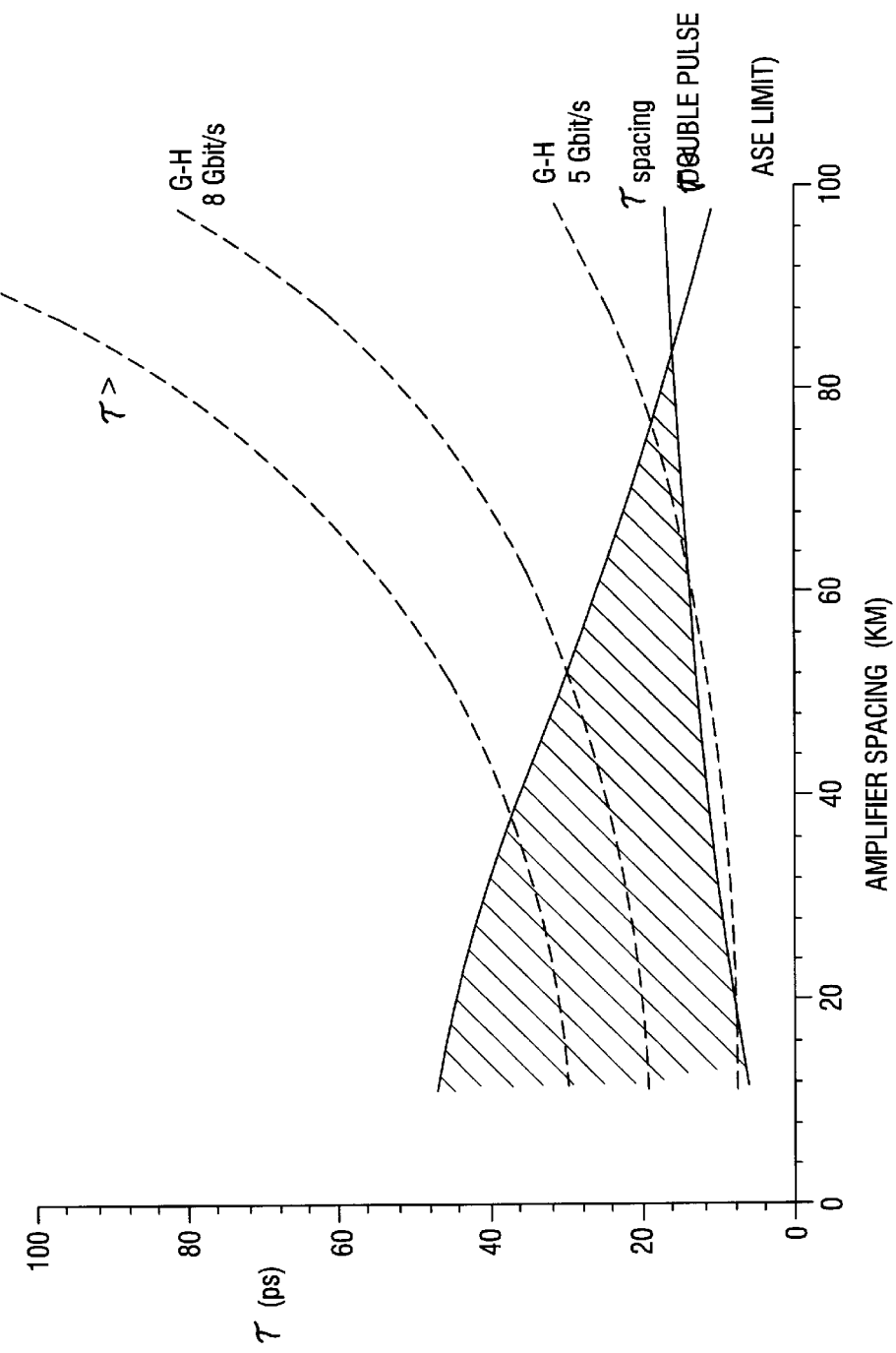
FIG. 2 is a graph of the factors determining the operational limit of a 6000 km system of FIG. 1 but using a double soliton pulse per bit according to the method of the present invention.

Referring to FIG. 2, there is shown the calculated limits for the two soliton per bit transmission of the present invention in which the reduced jitter benefit has not been included as this may not pertain with soliton-soliton collapse. The effect of increasing the average power without having to operate with a shorter soliton pulse can be seen to open the operating window to that shown by the shaded area of FIG. 2. Thus an 80 km amplifier spacing can be achieved for data rates under 5 Gbits/s or 50 km amplifier spacing at 8 Gbits/s data rate. For close spacing of amplifiers, 10 Gbit/s operation is possible which could not be achieved previously.

Figure 3:
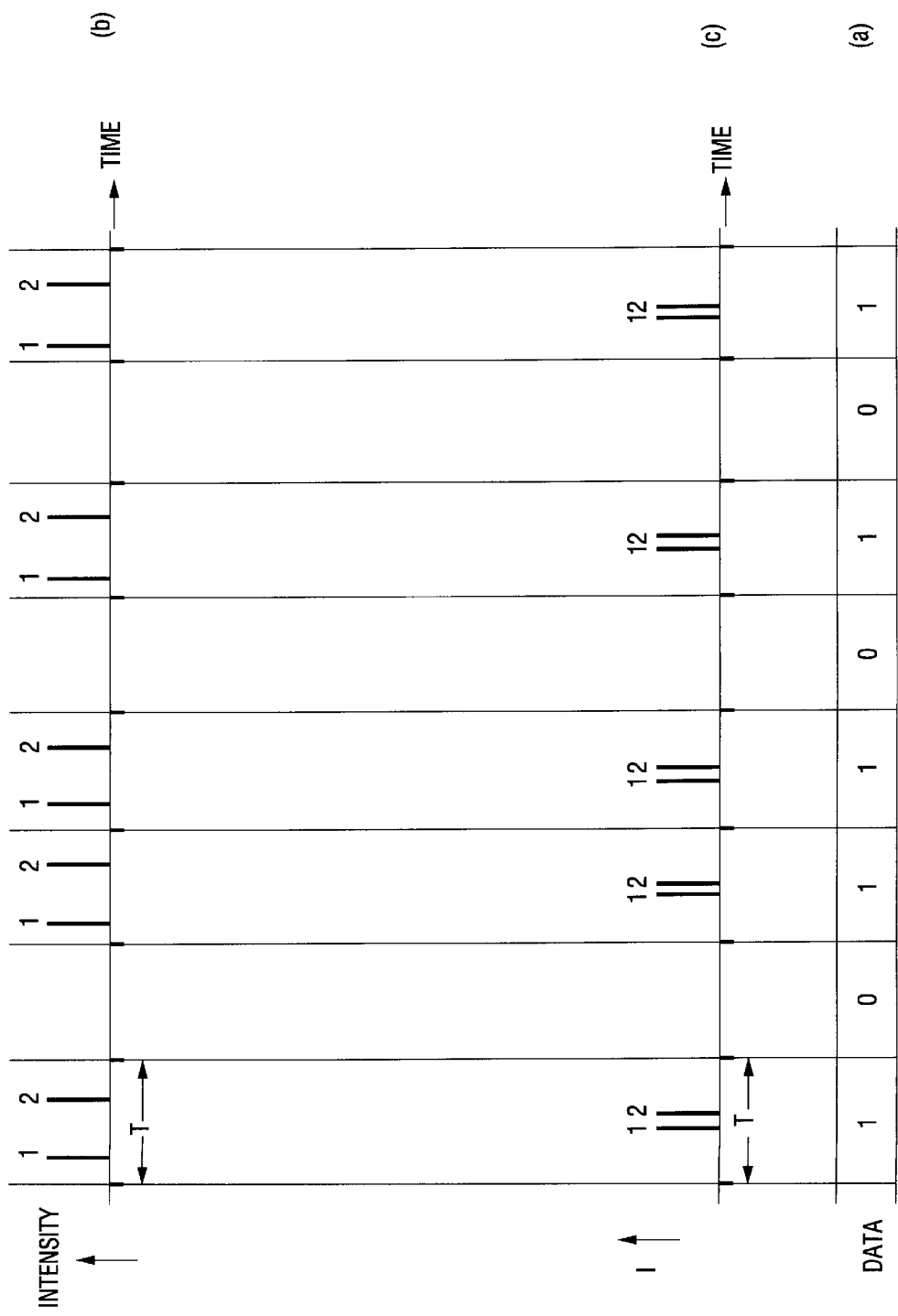
FIGS. 3(a), (b) and (c) are diagrammatic representations of a binary information signal transmitted according to the present invention having uniform and non-uniform pulse spacings respectively.

Referring now to FIG. 1, there are shown two modulation schemes of the present invention in which an exemplary data stream of binary digits of FIG. 3(a) have been encoded with two soliton pulses per bit in which the presence of a pulse represents a value of 1. In FIG. 3(b) the soliton pulses are equidistantly spaced in the bit period. In FIG. 3(c) the soliton pulse pairs are bunched towards the centre of the bit period so the time interval between each series of two pulses in a bit is greater than the time interval between the pulses within a bit period.

Figure 4:
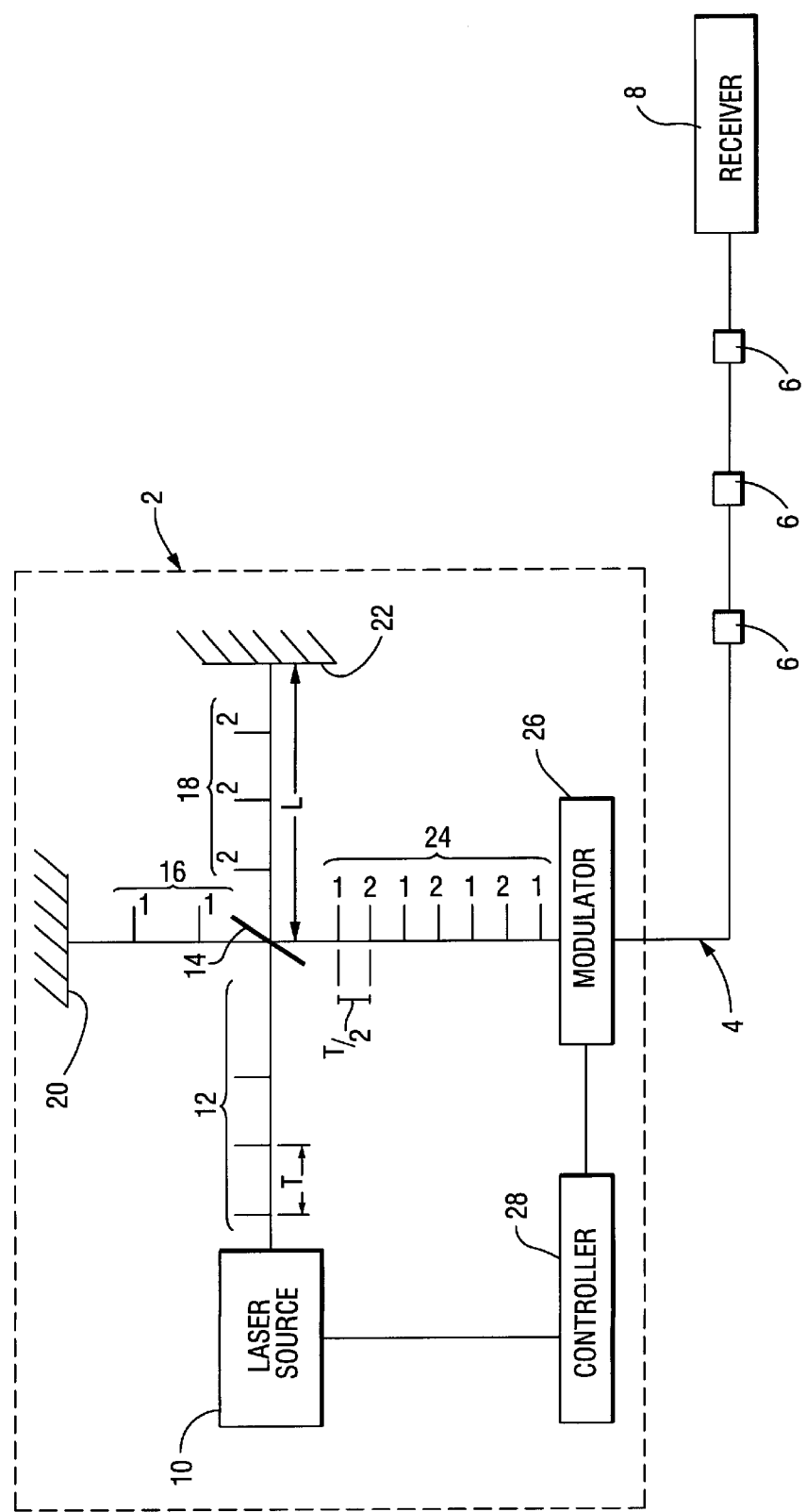
FIG. 4 is an embodiment of an optical communications system according to the present invention.

Referring to FIG. 4, an optical communication system comprises an optical transmitter 2, a 6,000 km optical fibre transmission line with spaced apart erbium fibre amplifiers 6, and an optical receiver 8.

The transmitter 1 comprises a mode-locked, semiconductor laser 10 which generates in a known manner a stream of optical soliton pulses which is directed at a bulk optic beamsplitter 14. The stream 12 is divided by the beamsplitter 14 into two subsidiary streams 16 and 18 (with pulses labelled P1 and P2, respectively) which are reflected back to the beamsplitter 14 by mirrors 20 and 22. The distance L of the mirror 22 from the beamsplitter 14 is adjustable. The distance is set, in FIG. 4, to obtain equidistant interleaving of the subsidiary streams 16 and 18 to form an output stream 24 of pulses at twice the rate provided by the laser 10. The mirror 22 can be adjusted to tune the phases of pulses P1 relative to pulses P1.

The output stream 24 is modulated by modulator 16 in response to electrical signals from a controller 28 modulated with a binary information signal. The data rate is such that two soliton pulses lie in a single bit period.

The modulated soliton pulse stream is then coupled into the optical fibre transmission line 4, 6 for onward propagation to the receiver 8 by standard optical means (not explicitly shown).

What is claimed is:

1. A method of transmitting digital data comprising:
   providing digital data in the form of bits each having one of two possible binary digit values;
   defining a sequence of successive bit periods for the bits respectively;
   generating a time series of successive distinct optical soliton pulses; and encoding each bit having a predetermined one of said two possible values as a time series of n of said distinct optical soliton pulses during the bit period thereof, where n is an integer>1.

2. A method as in claim 1 including the step of generating each series of n optical soliton pulses by generating a continuous stream of optical soliton pulse and modulating the stream as (1/n)th the pulse repetition rate.

3. A method as in claim 1 in which each series of n optical soliton pulses representative of a binary digit is separated from the next series by a time interval greater than the time interval between consecutive pulses within each series.

4. A method as in claim 3 in which each pulse in each series of n optical soliton pulses is out of phase relative to adjacent pulses in the series.

5. A method as in claim 1 in which the optical soliton pulses are generated by means of a mode-locked semiconductor laster.

6. An optical transmitter for transmitting information as a series of binary digits, each having one of two values, said transmitter comprising:
 a source of optical soliton pulses providing at an output port a series of n separate optical soliton pulses, where n is an integer>1, at each occurrence of one of the binary digit values, and
 optical coupling means optically connected to said output port for coupling or not coupling the series of n soliton pulses into an optical fibre as a function of said binary digit values.

7. A transistor as in claim 6 wherein said source includes a generating means for generating a continuous stream of optical soliton pulses having a predetermined pulse repetition rate and said coupling means includes a modulating means to modulate the stream at (1n/th) the pulse repetition rate.

8. A transmitter as in claim 6 in which each series of n optical soliton pulses representative of a binary digit is separated from the next series by a time interval greater than the time interval between pulses within each series.

9. A transmitter as in claim 8 in which each pulse in each series of n optical soliton pulses is out of phase relative to adjacent pulses in the series.

10. An optical transmitter as in claim 6 in combination with an optical transmission system having an optical fiber communications network, said optical transmitter being optically coupled to said optical fibre communications network which includes two or more spaced apart optical amplifiers.

11. A system as in claim 10 in which the optical amplifiers are optical fibre amplifiers.

12. An optical transmission system as in claim 10, further including a receiver coupled to the optical fibre communications network for receiving the transmitted optical soliton pulses.

13. A transmitter for transmitting information as a series of binary digits, each having one of two values, said transmitter comprising:
 a source of optical soliton pulses providing at an output port a series of n optical soliton pulses, where n is an integer>1, at each occurrence of one of the binary digit values, and
 optical coupling means optically connected to said output port for coupling or not coupling the series of n soliton pulses into an optical fibre as a function of said binary digit values,
 said source means including:
  a source of optical soliton pulses;
  a beam splitter located to split the stream of optical pulses into two subsidiary streams;
  a pair of reflective means to reflect the two subsidiary streams back to the beam splitter;
  the reflective means being positioned such that the two subsidiary streams are combined by the beam splitter to form an output stream of optical soliton pulses alternate pulses of which derive from different ones of the subsidiary streams.

14. A transmitter as in claim 13 in which the distance of at least one of the reflective means from the beam splitter is adjustable.

15. A transmitter as in claim 13 in which the reflective means are positioned to provide equidistant spacing of the pulses in the output stream.

16. A transmitter as in claim 13 in which the reflective means are positioned to provide the output stream of optical soliton pulses as pairs of pulses, each pair separated from the next pair by a time interval greater than the time interval between pulses of each pair.

17. A method of transmitting digital data in the form of a sequence of bits in successive bit periods, said method comprising the steps of:
 producing a soliton pulse series;
 deriving from the soliton pulse series at least first and second subsidiary streams of soliton pulses, each of said subsidiary streams corresponding to the soliton pulse series;
 combining the subsidiary streams to produce a carrier pulse stream wherein each of the bit periods includes soliton pulses from each of the subsidiary streams; and
 modulating the carrier stream according to the digital data, whereby successive bits of the digital data are represented by the presence or absence of a plurality of soliton pulses during each successive bit period.

18. Apparatus for transmitting digital data in the form of a sequence of bits in successive bit periods, said apparatus comprising:
 a digital data source;
 an optical source producing an optical soliton pulse series;
 means for deriving from the soliton pulse series at least first and second subsidiary streams of soliton pulses, each of said subsidiary streams corresponding to the soliton pulse series;
 combining means for combining the subsidiary streams to produce a carrier pulse stream wherein each of the bit periods includes soliton pulses from each of the subsidiary streams; and
 modulator means for modulating the carrier stream according to the data from the digital data source, whereby successive data bits of the digital data are represented by the presence or absence of a plurality of soliton pulses during each successive bit period.

* * * * *